United States Patent [19]

Pace

[11] 4,259,828

[45] Apr. 7, 1981

[54] IRISH MOSS HARVESTER

[76] Inventor: Dan R. Pace, P.O. Box 5083, Halifax, Nova Scotia, Canada, B3L 4M6

[21] Appl. No.: 122,805

[22] Filed: Feb. 19, 1980

[30] Foreign Application Priority Data

Mar. 26, 1979 [CA] Canada ................................. 324129

[51] Int. Cl.³ .......................................... A01D 45/08
[52] U.S. Cl. ......................................................... 56/9
[58] Field of Search ..................................... 56/1, 8, 9

[56] References Cited

U.S. PATENT DOCUMENTS

| | | | |
|---|---|---|---|
| 2,941,344 | 6/1960 | Vertson | 56/9 |
| 3,347,029 | 10/1967 | Grinwald | 56/9 |
| 3,468,106 | 9/1969 | Myers et al. | 56/9 |
| 3,540,194 | 11/1970 | Chaplin | 56/9 |
| 3,878,669 | 4/1975 | Chaplin | 56/9 |

FOREIGN PATENT DOCUMENTS 586881  1/1978  Japan ............................................. 56/8

*Primary Examiner*—Robert A. Hafer
*Attorney, Agent, or Firm*—Colton & Stone, Inc.

[57] ABSTRACT

A harvester for plants such as Irish moss is disclosed. The harvester may be towed along the sea bed by a surface vessel and provides for the continuous pumping of harvested plants to the vessel by way of an enclosed conduit. The harvester includes a plurality of axially spaced harvest rollers rotatably mounted in a frame. A plurality of guide rollers are pivotally mounted relative to the harvest rollers in advance thereof with each guide roller being longitudinally aligned with a corresponding space between adjacent harvest rollers. A continuous mesh-like harvest belt extends around the guide and harvest rollers with the lengthwise members thereof being entrained around the guide rollers and positioned in the spaces defined between the harvest rollers. The transverse members of the belt are flexible and extend between the endless members so as to be positioned, in the lower run thereof on the sea bed, and so as to engage and conform to the contour of the harvest rollers. Plants are trapped between the transverse belt members and the harvest rollers so as to be pulled from the sea bed for subsequent deposit in a collection trough from which they are pumped to the surface vessel. The harvester is simple and economic to produce and use and is efficient in collecting a wide swath of plants from the sea bed.

12 Claims, 6 Drawing Figures

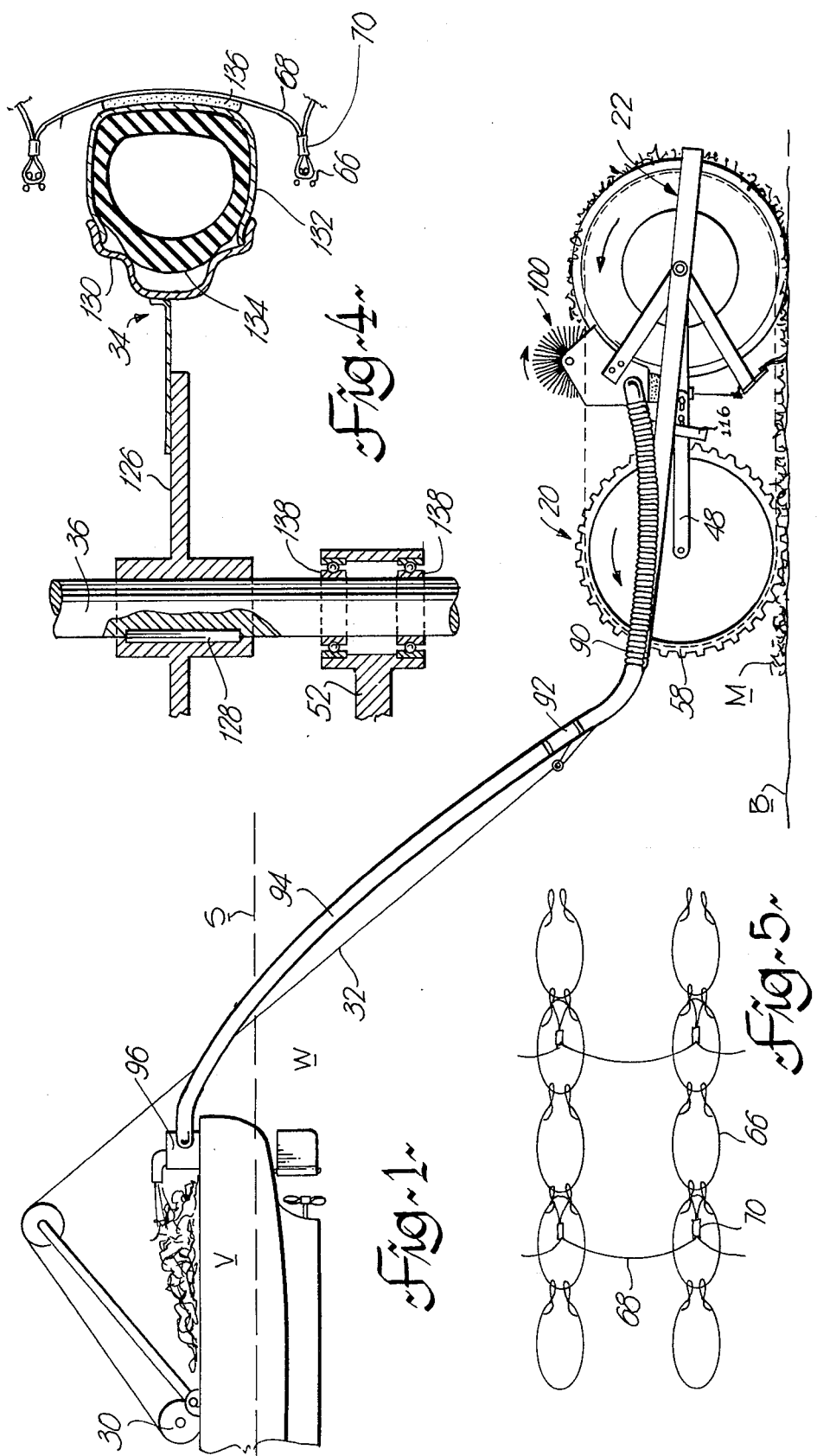

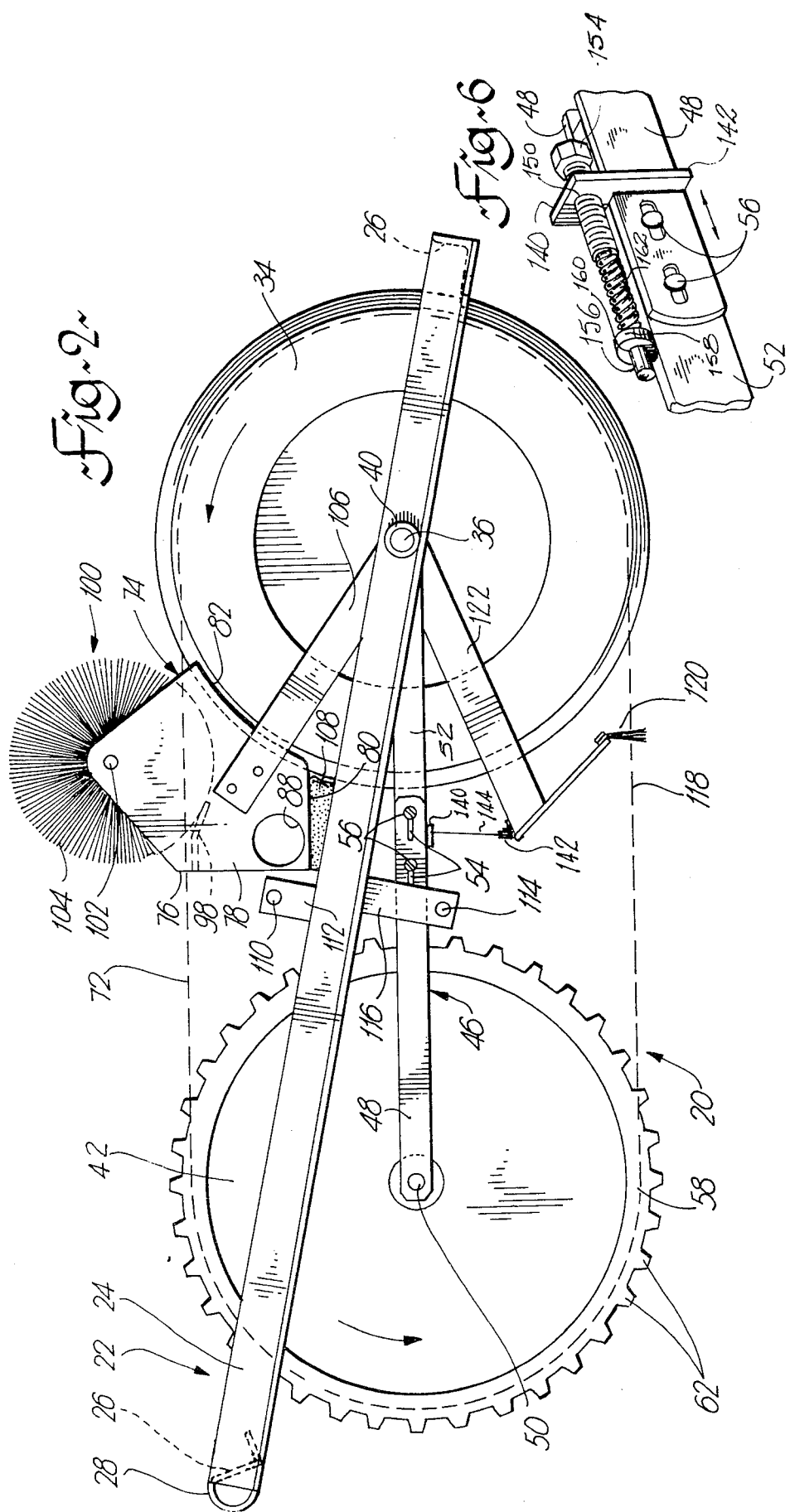

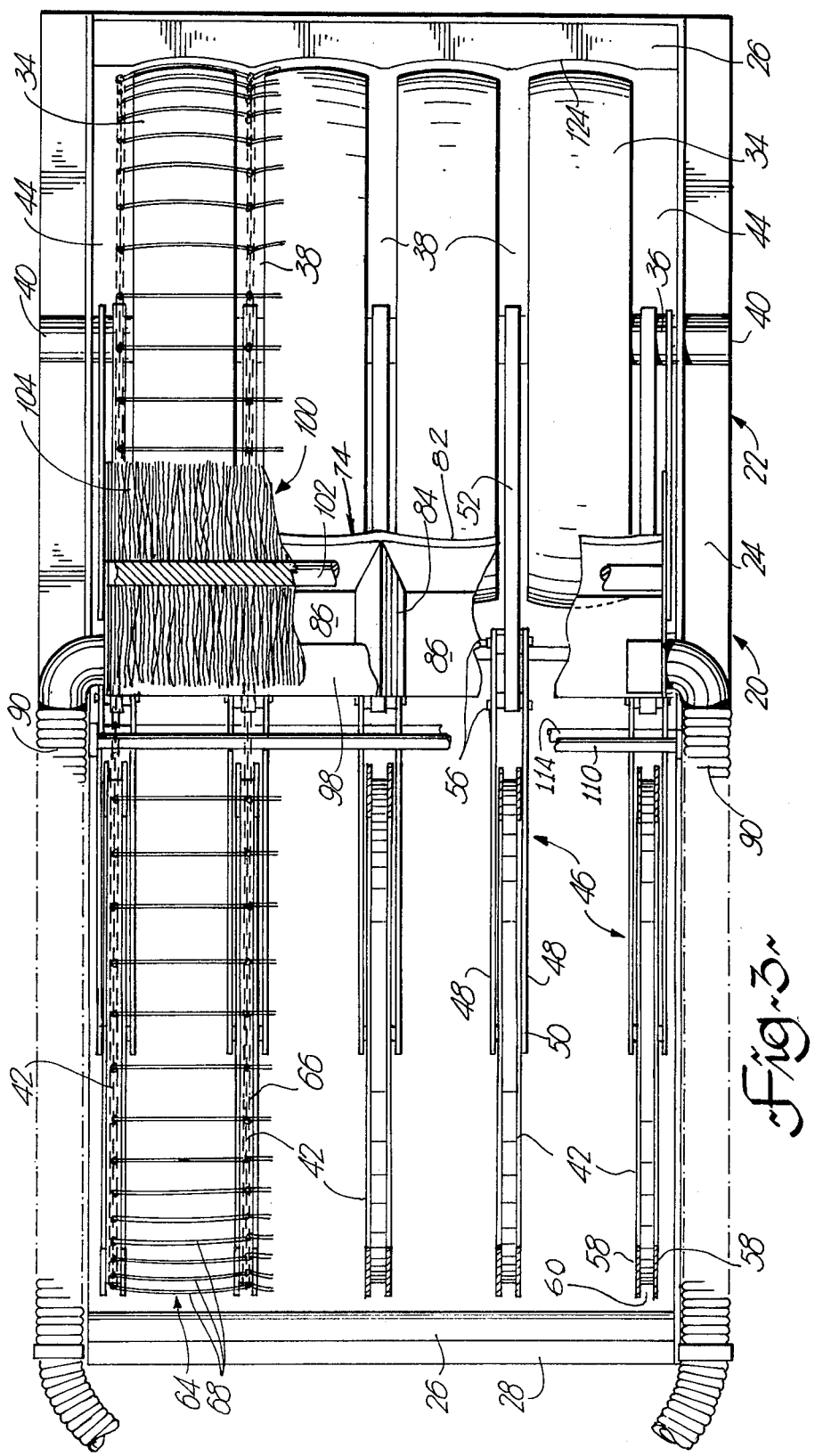

IRISH MOSS HARVESTER

The present invention relates in general to a device for harvesting growing plants and in particular to a device for harvesting marine plants such as Irish moss.

BACKGROUND OF THE INVENTION

Irish moss is an alga having many stalks or fronds on a shallow root system, the moss generally growing on a rocky sea bottom since it attaches itself to the surface of rocks by a disc-like holdfast. The frond divides repeatedly to form a bushy head, the frond being tough and resilient and having an overall length of three to five inches.

Many attempts have been made in the past to harvest Irish moss, examples being found in U.S. Pat Nos. 2,941,344 (Jertson, June 21, 1960) and 3,540,194 (Chaplin, Oct 2, 1968). Each of these patents illustrates complex structures using a continuous conveyor mechanism which either combs the plants to cut them from the substrate (Jertson) or extracts the entire plant from the substrate (Chaplin), the conveyors carrying the harvested plants to the surface. The Chaplin structure also carries much of the substrate to the surface, disrupting the substrate sufficiently to make new growth difficult. The Jertson structure uses flat comb-like rake member which rid over the substrate. Single rakes of similar construction are considered to have a detrimental effect on the Irish moss resource.

SUMMARY OF THE PRESENT INVENTION

The harvester of the present invention is an improvement in the harvesting of Irish moss. It utilizes flexible harvest members which readily conform to the substrate without damaging the plants to be harvested. It is relatively simple and economic to manufacture and does not require a continuous moving conveyor to transport the harvested plants to the surface.

In its broadest form the present invention provides a harvester for plant fronds growing from a substrate comprising: a frame; a plurality of axially separated harvest rollers, adjacent rollers defining a space therebetween, the rollers being rotatably mounted on an axle journalled within the frame; a plurality of guide rollers, each guide roller being aligned with the corresponding space between adjacent harvest rollers; linkage means connecting each guide roller with the axle for independent pivotal movement relative thereto; harvest means engageable with the guide rollers and the harvest rollers, the harvest means including a plurality of endless members, each extending around a corresponding guide roller and being receivable in the space aligned with that guide roller, and a plurality of spaced apart harvest members extending between adjacent pairs of the endless members, the harvest members being engageable with and conforming to the peripheral contour of the associated harvest roller whereby, as the harvester is moved forwardly fronds trapped between the harvest rollers and the harvest members are pulled from the substrate; and means for collecting fronds harvested by the harvester.

When the harvester is used to harvest marine plants such as Irish moss it is towed by a surface vessel with the harvester resting on the sea bed or substrate. The harvester means may utilize a lock-link type of chain to form the endless members and a plurality of stainless-steel wires extending between the chains as the harvest members. As the harvester advances through the crop the harvest means acts like the track on a track-laying vehicle. The flexible wires are forced downwardly through the plants by the guide rollers and the fronds are pressed forwardly by the advancing harvest rollers. The fronds are trapped between the wires and the harvest rollers and as the harvest rollers advance further, the trapped fronds are pulled from the substrate. These fronds then follow around the harvest rollers to be dropped from the upper run of the harvest means into a collection trough positioned adjacent the forward upper quadrant of the harvest rollers. Fronds deposited in the trough may then be pumped via a conduit to a suitable receptacle on board the surface vessel.

Thus it is seen that with the present invention the main collection of harvested fronds occurs at the sea bottom. There will be no loss of fronds as they are transported to the surface, a problem which is evident with the prior art harvesters. The present harvester is essentially self-contained with the major operating structure being at the sea bed. The harvester is constructed so that it will follow the contour of the substrate without damaging the sea bed and without missing any substantial areas of the crop to be harvested. The harvester may be raised or lowered by a winch and tow line connected to the surface vessel.

BRIEF DESCRIPTION OF THE DRAWINGS

FIG. 1 shows the harvester of the present invention in use harvesting Irish moss from a sea bed, in elevation.

FIG. 2 shows an enlarged elevation of the harvester of the present invention.

FIG. 3 shows an enlarged plan view of the harvester of the present invention.

FIG. 4, appearing on the same sheet as FIG. 1, shows, in partial cross-section, details of the harvester assembly.

FIG. 5, appearing on the same sheet as FIG. 1, shows schematically an example construction of the harvest means utilized in the present invention.

FIG. 6, appearing on the same sheet as FIG. 2, shows an alternate structure for mounting the guide roller supporting arms.

DESCRIPTION OF THE PREFERRED EMBODIMENT

While the present invention was designed primarily for the harvesting of marine crops, such as Irish moss and, while the present description is primarily directed to such usage, it should be understood that the present harvester is not restricted to such usage and that it could possibly be used to harvest crops on land as well.

FIG. 1 shows a typical marine environment comprising a body of water W having a surface S, a bottom or bed B and a zone of marine plants such as Irish moss M. Irish moss, like many marine plants does not have a deep root system and it can be harvested by applying a force generally axially thereof to pull its upright portions away from the prostrate basal portion from which new erect shoots will issue. In this manner the plant fronds can be harvested repeatedly. The harvester of the present invention can be utilized to harvest a wide swath of fronds as it advances through the moss with minimum damage to the plants.

As seen in FIGS. 1, 2 and 3 the main body of the harvester is indicated by reference number 20. It includes a generally rectangular frame 22 having opposed side members 24 and end members 26, the leading end member having a rounded section 28 to help prevent damage to the plants as the harvester advances. As shown in FIG. 1 the leading end member may be connected to a winch 30 on board a surface vessel V by way of a cable 32. The vessel provides the forward movement for the harvester while the winch and cable connect the harvester to the vessel and can be used to raise or lower the harvester.

With specific reference to FIGS. 2 and 3, the harvester includes a plurality of axially separated harvest rollers 34 keyed to an axle 36 so that adjacent rollers 34 define a space 38 therebetween. Axle 36 is journalled to the frame side members 24 in a conventional manner as at 40. The construction of the individual harvest rollers 34 will be described in greater detail hereinafter with reference to FIG. 4.

A plurality of guide rollers 42 is also provided within the confines of frame 22. As illustrated in FIG. 3, each roller 42 is aligned with a corresponding space 38 between adjacent harvest rollers 34 although the two outermost rollers 42 are each aligned with a space 44 between the corresponding outermost harvest roller 34 and the adjacent side member 24 of the frame 22. Thus for a specific number n of harvest rollers 34 there will be n+1 guide rollers 42.

Linkage means 46 connects each guide roller 42 to the axle 36 for pivotal movement thereof relative to the axle. The linkage means may include a pair of arms 48 attached at one end to the stub axle 50 of the associated guide roller 42 and at the other end to one end of a pivot arm 52 which at its other end is pivotally connected to the axle 36. The pivot arm may be adjustably connected to the arms 48 as by slots 54 with bolts 56 slidable therein so as to provide for relative longitudinal adjustment of the arms to thereby adjust the position of a guide roller 42 relative to the axle 36. With this type of connection each guide roller 42 is independently adjustable and pivotable relative to the axle 36.

FIG. 6 illustrates an alternate structure for the connection between the pivot arm 52 and the arms 48. A generally U-shaped nut member 140 is fixed to the arms 48 as by welding along the legs 142 thereof, one leg being welded to each of the arms 48. Member 140 is provided with a centrally located threaded bore 150 which receives a threaded adjusting bolt 154 which bolt is threaded along a portion of its shank. The nonthreaded portion 156 of the bolt extends outwardly from the threaded portion above and parallel to the pivot arm 52. A retainer member 158 having a through bore 160 is welded to the top surface of the pivot arm 52, the bore 160 slidably receiving the portion 156 of the bolt 154. A helical compression spring 162 is positioned on the portion 156 between the retainer 158 and the end face of the threaded portion of the bolt 154. In this embodiment the adjusting bolts 56 would be tightened to the point where sliding motion between the arms 48 and 52 is not restricted. This construction permits the arms 48 and 52 to extend and contract independently against the adjustable spring 162 so as to compensate for any minor imbalance which might arise if the position of the arms 48 and 52 were fixed relative to each other. This construction would also act as a shock absorber to aid in preventing damage to the harvester should the guide roller encounter solid objects such as large rocks.

Each guide roller 42 is provided with a pair of annular plates 58 adjacent the periphery on each side thereof, which plates define therebetween a peripheral groove 60. Each plate 58 has means for engaging the substrate or sea bed in the form of a plurality of circumferentially spaced radially directed teeth 62, best illustrated in FIG. 2.

Referring now to FIGS. 3 and 5 the harvest means 64 which, in conjunction with the harvest rollers 34, is used to harvest the growing plants will be described. In essence the harvest means includes a plurality of endless members 66 in the form of a chain or the like, each of which is received in the groove 60 of a corresponding guide roller 42 and extends rearwardly to be received in the space 38 (or 44) with which the guide roller is aligned. A plurality of spaced apart flexible harvest members 68 extend between and are connected to adjacent pairs of the endless members giving the harvest means the appearance of an endless mesh belt. At the forward end of the harvester the harvest members 68 span the distance between adjacent guide rollers 42 with the spacing between the members 68 being the same as the pitch of the teeth 62 so that each harvest member passes between adjacent teeth about the periphery of the guide roller. At the rearward end of the harvester the members 68 contact the peripheral surface of the harvest rollers 34 and, because the members 68 are flexible they will conform to the contour of the peripheral surface, which, as seen in FIG. 3, is slightly convex in transverse cross-section.

One example of a suitable harvest means is illustrated in FIG. 5. Therein the endless members 66 are formed as a lock-link type weldless chain and the harvest members 68 are composed of continuous flexible material such as braided or twisted stainless steel wires which are loosely secured at regular intervals to the chains for pivotal movement relative thereto as by crimps 70. As shown in FIG. 5 the harvest members 68 are assembled to the endless members so that when the members 66 are positioned between the rollers 34 and on the rollers 42 they will be slightly bowed so that they will conform generally to the peripheral contour of the harvest rollers 34.

Mounted in the harvester adjacent the harvest rollers 34 but below the upper run 72 of the harvest means 64 is a trough 74 acting as a collecting means for harvested fronds. Trough 74 has a forward transverse wall 76, end walls 78 which project above the upper run 72, a transverse bottom wall 80 and an arcuate transverse rear wall 82. As seen in FIGS. 2 and 3 the rear wall 82 is formed as an arcuate surface for close conforming juxtaposition to the periphery of the harvest rollers 34. As seen in FIG. 3 the rear wall is also transversely contoured to conform to the peripheral contour of each harvest roller.

Trough 74 is centrally divided by a divider plate 84 to form two collecting zones 86, 86. Each end wall 78 has a circular opening 88 therein adjacent the lower forward corner thereof for reception of a flexible conduit 90 (FIGS. 1 and 3), the two conduits 90 extending forwardly to a coupling 92. A single conduit 94 connects the coupling 92 to a pump 96 positioned on the surface vessel so that harvested fronds may be continuously transported from the collecting trough 74 to a suitable receptacle aboard the surface vessel.

Extending transversely of the trough 74 along the upper edge of the forward wall 76 and immediately subjacent the upper run 72 is a scaper blade 98 which may be formed of a wear-resistant material such as ultra high density polyethylene. The blade 98 is useful in removing fronds from the harvest means 64 so that the fronds will drop into the collecting trough 74.

As indicated previously the end walls 78 of trough 74 extend above the upper run, as seen in FIG. 2. The end walls support a brush assembly 100 which extends transversely of the harvester above the trough 74. The brush assembly includes an axle 102 journalled in the end walls 78 and a plurality of radially directed bristles 104 which are of a length sufficient to contact the scraper blade 98 and to extend below the upper run 72.

Trough 74 may be constructed entirely of a rigid material or it may utilize a rigid frame covered by or connected to, a flexible material. The trough is connected to an arm 106 at one end thereof, the other end of arm 106 being rotatably connected to axle 36. A flotation pad 108 positioned on the trough bottom outer wall 80 biases the trough upwardly against the underside of the upper run 72 so that the scraper blade 98 is maintained in close proximity with the underside of the upper run 72.

Two transverse cross-bars are attached to the frame 22 between the harvest rollers 34 and the guide rollers 42. Upper cross-bar 110, in the form of a rod mounted in end plates 112 passes above the linkage means 46 and prevents the harvester from flipping backward on itself when it is raised to the surface. Lower cross-bar 114, also in the form of a rod mounted in end plates 116, passes below the linkage means 46 and prevents the guide rollers from flipping under the harvester when it is raised to the surface. Cross-bar 114 also can be used to raise the guide rollers 42 clear of the sea bed or substrate, as when turning corners, by drawing up on the tow cable 32.

Positioned below the frame 22 forward of the harvest rollers and above the lower run 118 of the harvest means is a plurality of transverse brushes 120 mounted to supporting arms 122 which in turn are pivotally connected to the axle 36. As illustrated in FIG. 2, each brush 120 passes over the mesh of the harvest means 64.

As shown in FIG. 3 each arm 122 carrying a brush 120 is not only pivotally connected to axle 36 but is also suspended from the arm 46. Each set of arms 46 carries a plate 140 as seen in FIG. 2 and each arm 122 carries a pulley 142. A wire 144 is strung from the plate 140 on one arm 46 around the pulley 142 to a plate 140 on an adjacent arm 46. In this manner each brush 120 is suspended at a position which is relative to the mean position of the two adjacent arms 46 to which it is connected.

FIG. 3 illustrates a further feature of the frame 22 wherein it is seen that the inside edge 124 of the rearmost end member 26 is contoured to closely follow the contours of the harvest rollers 34 thereby defining a narrow space between the peripheral surface of each harvest roller and the inner edge 124. The narrow space will permit the passage therethrough of plant material but will prevent the passage of large objects such as stones.

Reference may now be made to FIG. 4 which shows an enlarged plan view, partly in cross-section of a portion of the assembly of the harvester. Axle 36 is shown as is a harvest roller 34. While it would be possible to utilize many different constructions to achieve suitable harvest rollers, I have found that a simple, and economical harvest roller can be made from an automobile tire. Thus the harvest roller 34 may include a vehicle wheel 126 keyed to the axle 36 as by key 128 and having a rim 130. A tire 132 is affixed to the rim and an inner tube 134, filled with water, is located within the tire carcass. The tire tread is removed and may be replaced by a soft, flexible covering 136 of, for example, foam rubber.

FIG. 4 also shows one pivot arm 52 of the linkage means 46 connected to axle 36 as by bearings 138.

OPERATION

The operation of the harvester of the present invention will now be described with reference to the harvesting of Irish moss from a sea bed although, as indicated previously the present harvester could be used to harvest other marine crops and could also be used to harvest land crops as well.

The harvester is first of all assembled as described hereinabove and it is lowered to the sea bed as by winch 30 and cable 32. The harvest means has previously been assembled to the harvest rollers 34 and guide rollers 42 and it has been tensioned by adjusting the linkage means 46 for each guide roller. With the harvester on the sea bed the surface vessel V will then pull the harvester through the crop to be harvested as by the cable 32.

As the harvester advances through the crop teeth 62 on the guide rollers, fabricated from or coated with a semi-flexible material such as hard rubber to minimize crop damage, engage the substrate and enhance rotation of the guide rollers. The relatively narrow thickness of the transverse harvest members 68 permits them to penetrate through the layer of vegetation to the substrate. As in a track-laying vehicle the harvest rollers 34 move forwardly on the harvest means and the fronds, projecting through the harvest means in the spaces between the members 68 are bent forward across those members by the approaching rollers 34. Brush 120 aids to pre-orient the fronds to a forward-leaning position in advance of the harvest rollers 34, this being especially useful when the harvest rollers 34 are of relatively large diameter and their effectiveness in bending the fronds forward over the members 68 may be somewhat reduced.

As the harvester advances, the bent-over fronds are trapped between the members 68 and the peripheral surface of the harvest rollers 34. Further advancement of the harvester will cause an upward force to be placed on the trapped fronds and those fronds will be pulled from the substrate. The trapped fronds travel upwardly around the harvest rollers and are released at the upper run 72 to fall into the trough 74. Any fronds still clinging to the upper run 72 are forcibly removed by the bristles 104 of the brush assembly 100 which rotates due to its engagement with the upper run 72. Scraper blade 98 will remove fronds from the bristles 104 and any other fronds still clinging to the upper run 72.

Fronds which collect in the trough 74 are pumped to the surface vessel V by the pump 96 and the conduits 90,94.

As previously indicated, each guide roller 42 is independently connected to axle 36 for pivotal movement relative thereto. Thus the guide rollers can independently follow the contour of the substrate within the limitations imposed by the cross-members 110 and 114 and the cross-members 68 of the harvest means 64. By thus maximizing contact between the guide rollers and the substrate sliding of the harvester across the substrate is reduced. Sliding causes the fronds to flatten below the harvest members 68 instead of projecting up between them as required. The harvest rollers 34 being keyed to a common axle do not independently follow the contours of the substrate.

The embodiments of the invention in which an exclusive property or privilege is claimed are defined as follows:

1. A harvester for plant fronds oriented generally away from a substrate comprising:
   (a) a frame;
   (b) a plurality of axially separated harvest rollers, adjacent rollers defining a space therebetween, said rollers being rotatably mounted on an axle journalled within said frame;
   (c) a plurality of guide rollers, each guide roller being aligned with the corresponding space between adjacent harvest rollers;
   (d) linkage means connecting each guide roller with said axle for independent pivotal movement relative thereto;
   (e) harvest means engageable with said guide rollers and said harvest rollers, said harvest means including a plurality of endless members, each extending around a corresponding guide roller and being receivable in the space between adjacent harvest rollers which is aligned with that guide roller, and a plurality of spaced apart harvest members extending between adjacent pairs of said endless members, said harvest members being engageable with the peripheral contour of the associated harvest roller whereby, as said harvester is moved forwardly fronds trapped between said harvest rollers and said harvest members are removed from said substrate; and
   (f) means for collecting fronds harvested by said harvester.

2. The harvester of claim 1 wherein each guide roller has a circumferential groove at the peripheral surface thereof for receiving the endless member associated therewith, and substrate engaging means adjacent said peripheral surface.

3. The harvester of claim 2 wherein said substrate engaging means includes a plurality of circumferentially spaced, radially projecting teeth, extending radially outwardly beyond said groove.

4. The harvester of claim 3 wherein said linkage means includes, for each said guide roller, a pivot arm pivotally connected at one end to said axle and lengthwise adjustably connected at the other end to one end of a pair of arms, the other end of said pair of arms being pivotally connected to a stub axle supporting the guide roller.

5. The harvester of claim 4 wherein the peripheral contour of each harvest roller is convex in transverse cross-section and is provided with a soft, flexible covering layer conforming to said contour.

6. The harvester of claim 1 wherein said collecting means includes a trough extending transversely of said frame, above said side members and adjacent the peripheral surface of said harvest rollers, means for removal of plants from said harvester means, and means for delivering harvested plants from said trough to a main collection point.

7. The harvester of claim 6 wherein said removal means includes a scraper blade affixed to said trough immediately subjacent said harvester means between said harvest rollers and said guide rollers, and a generally cylindrical rotatable brush assembly extending transversely of said frame above said trough and between said scraper blade and said harvest rollers, said brush assembly having radially directed bristles engageable with said harvest means as said brush assembly rotates.

8. The harvester of claim 1, 6 or 7 and including a plurality of brushes extending transversely of said frame and pivotally mounted to said axle and engageable with said substrate in advance of said harvest rollers to aid in pre-orienting fronds for entrapment between said harvest rollers and the associated harvest members.

9. The harvester of claim 6 wherein one end member of said frame is immediately adjacent said harvest rollers and has an inner surface thereof corresponding in contour to the peripheral contour of said harvest rollers, said trough having one side thereof also corresponding to the peripheral contour of said harvest rollers, said one side of said trough also corresponding arcuately to a portion of the circumference of said harvest rollers.

10. The harvester of claim 6 wherein, when said harvester is used to harvest marine plants with said harvester travelling on the bed of a body of water, said delivering means includes a conduit extending from said trough to a surface vessel and a pump for delivering harvested plant fronds from said trough, along said conduit, to said surface vessel.

11. The harvester of claim 7 and including a flotation pad fixed to said trough to bias said trough towards said harvest means such that said scraper blade is maintained in close proximity with said harvest means.

12. The harvester of claim 4 wherein said linkage means further includes a nut member fixed to said pair of arms, a retainer member fixed to said pivot arm, a bolt member having a threaded portion received in said nut member and a non-threaded portion slidably received in a bore through said retainer member, and compression spring means mounted on said non-threaded portion and positioned between said threaded portion and said retainer member.

* * * * *